United States Patent
Nozhchev et al.

(10) Patent No.: US 11,121,919 B2
(45) Date of Patent: Sep. 14, 2021

(54) METHODS AND APPARATUS TO DETERMINE A DURATION ESTIMATE AND RISK ESTIMATE OF PERFORMING A MAINTENANCE OPERATION IN A NETWORKED COMPUTING ENVIRONMENT

(71) Applicant: VMware, Inc., Palo Alto, CA (US)

(72) Inventors: Marin Nozhchev, Sofia (BG); Denitsa Gencheva, Sofia (BG)

(73) Assignee: VMware, Inc., Palo Alto, CA (US)

( * ) Notice: Subject to any disclaimer, the term of this patent is extended or adjusted under 35 U.S.C. 154(b) by 392 days.

(21) Appl. No.: 16/037,684

(22) Filed: Jul. 17, 2018

(65) Prior Publication Data

US 2019/0319839 A1 Oct. 17, 2019

Related U.S. Application Data

(63) Continuation-in-part of application No. 15/952,997, filed on Apr. 13, 2018, now Pat. No. 10,936,694.

(51) Int. Cl.
*G06F 11/34* (2006.01)
*H04L 12/24* (2006.01)
(Continued)

(52) U.S. Cl.
CPC ............ *H04L 41/0816* (2013.01); *G06F 8/65* (2013.01); *G06F 11/3409* (2013.01);
(Continued)

(58) Field of Classification Search
CPC .................................................. G06F 11/3409
See application file for complete search history.

(56) References Cited

U.S. PATENT DOCUMENTS

2016/0330182 A1   11/2016   Jeon et al.
2018/0324204 A1*  11/2018   McClory .................. G06F 8/71

OTHER PUBLICATIONS

United States Patent and Trademark Office, "Non-final Office Action," mailed in connection with U.S. Appl. No. 15/952,997, dated Jun. 26, 2020, 8 pages.

(Continued)

*Primary Examiner* — Kris E Mackes
(74) *Attorney, Agent, or Firm* — Hanley, Flight & Zimmerman, LLC

(57) ABSTRACT

Methods, apparatus, and systems are disclosed for determining a duration and/or risk estimate of performing a maintenance operation in a networked computing environment. An example apparatus includes a client data datastore to store telemetry data, associated with the maintenance operation, system configuration data, and a first secret, all received from a first virtual computing component operating in a virtual computing environment. The apparatus further includes a configuration comparator to identify configuration changes between a previous and current configuration of the virtual computing environment. A client data analyzer selects, based on the changes, an analysis model, and applies the model to generate results including the duration estimate or a risk of failure. The client data analyzer stores the results with the first secret and the configuration data, and a result interface retrieves and transmits the stored analysis results associated with the first secret matching a second secret included in a request.

20 Claims, 7 Drawing Sheets

(51) Int. Cl.
*H04L 12/26* (2006.01)
*G06F 8/65* (2018.01)

(52) U.S. Cl.
CPC .............. *H04L 41/14* (2013.01); *H04L 41/28* (2013.01); *H04L 43/04* (2013.01); *H04L 43/065* (2013.01)

(56) References Cited

OTHER PUBLICATIONS

United States Patent and Trademark Office, "Notice of Allowance," mailed in connection with U.S. Appl. No. 15/952,997, dated Oct. 23, 2020, 8 pages.

* cited by examiner

METHODS AND APPARATUS TO DETERMINE A DURATION ESTIMATE AND RISK ESTIMATE OF PERFORMING A MAINTENANCE OPERATION IN A NETWORKED COMPUTING ENVIRONMENT

RELATED APPLICATION

This patent arises from a continuation-in-part of U.S. patent application Ser. No. 15/952,997, which was filed on Apr. 13, 2018. Priority to U.S. patent application Ser. No. 15/952,997 is hereby claimed and U.S. patent application Ser. No. 15/952,997 is hereby incorporated herein by reference in its entirety.

FIELD OF THE DISCLOSURE

This disclosure relates generally to computing environments, and, more particularly, to methods and apparatus to analyze telemetry data in networked computing environments.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

In recent years, networked computing environments such as virtualized computing environments, physical computing environments, and hybrid computing environments, have grown in power and also complexity. One such type of networked computing environment is a cloud computing environment. Cloud service providers and cloud operators perform various operations involving software and hardware upgrades to keep the cloud networks operating efficiently. Similarly, cloud service providers and cloud operators perform cloud reconfigurations/expansions to increase/improve cloud operating capacity, storage and efficiency. Typically, such operations require system downtime as the cloud (or portions of the cloud) are taken out of service while the hardware/upgrade operations and/or cloud reconfiguration/expansion is/are performed.

DETAILED DESCRIPTION

Figure 1:
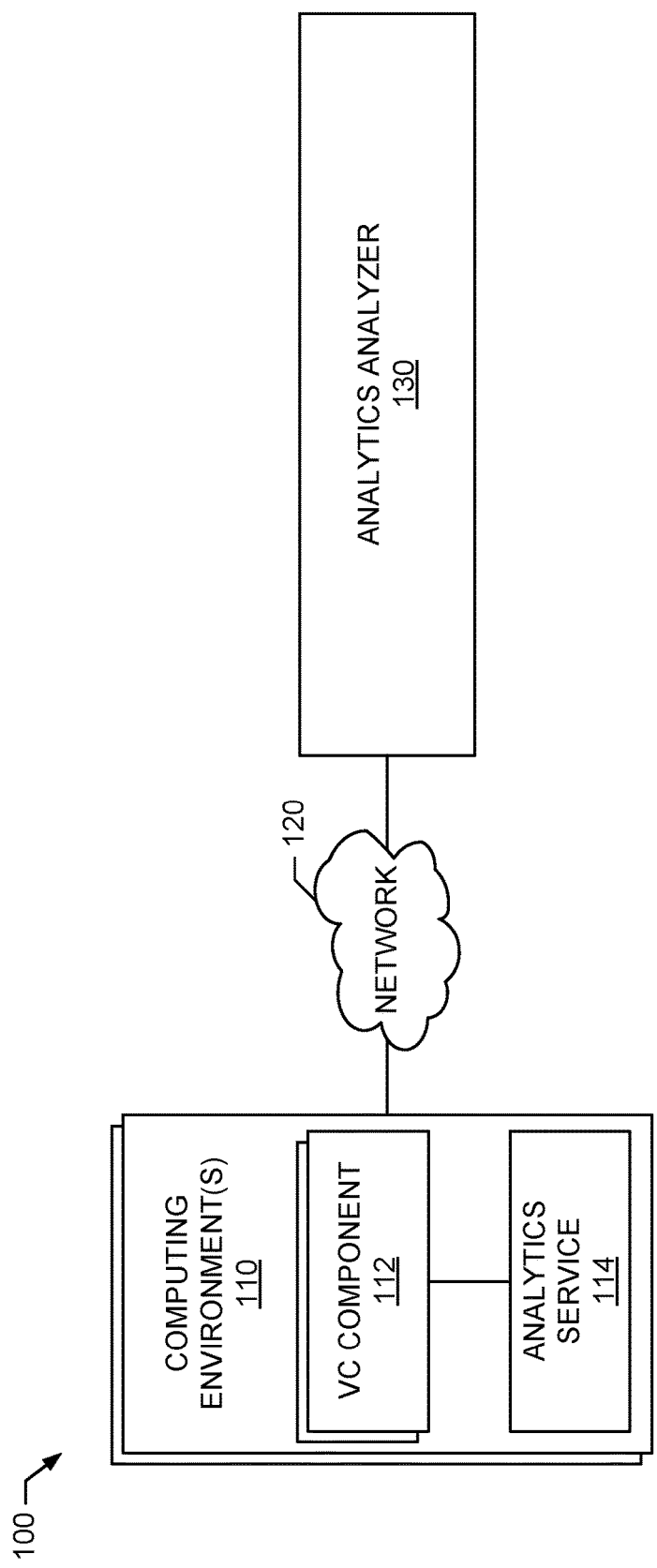
FIG. 1 is a block diagram of an example environment in which a cloud computing environment operates.

As the complexity of cloud computing environments has grown, the complexity of managing such environments has increased. To diagnose errors and manage cloud computing environments, telemetry data about the operation (e.g., performance statistics, configuration information, device information, etc.) may be collected. In some prior systems, telemetry data from a computing environment may be collected and analyzed. However, such analysis does not reveal information about the global use of similar computing systems and components (e.g., about the operation of virtual computing components in a multitude of computing environments). Further, due to the ease in which virtual computing environments are reconfigured and the nearly endless possible ways in such systems can be configured, makes the use of a single, static diagnostic algorithm/tool nearly impossible in the virtual computing space.

As a result of not having a static diagnostic algorithm/tool to diagnose system errors, system administrators are often unable to predict the duration of maintenance windows (in which hardware/software upgrades and cloud reconfiguration/expansion operations are to be performed) with any accuracy. For example, because each cloud configuration is often unique from other cloud configurations, it is difficult to know how long a system hardware/software upgrade (and/or reconfiguration) will take to perform and to know how such an upgrade (and/or reconfiguration) will interact with any particular cloud configuration. As a result, system administrators are reluctant to perform system upgrades and/or system reconfigurations until such upgrades and/or reconfigurations are absolutely necessary. In some cases, system administrators forego system upgrades/reconfigurations that are not necessary to operation but which would greatly improve operating efficiency. In other cases, system administrators will pick and choose only those upgrades/reconfigurations that are deemed to be critical and forego others. Unfortunately, delaying reconfiguration and/or upgrade operations and/or foregoing some reconfiguration and/or upgrade operations can adversely impact system efficiency and, in some cases, system operability. Thus, there is a need for methods, systems and apparatus that can predict, with accuracy, the length/duration of an upgrade/reconfiguration operation and that can predict the likelihood of success of such upgrade/reconfiguration operations.

Methods, systems, and apparatus disclosed herein enable the collection of telemetry information/data from multiple cloud computing systems having different configurations to a central facility (e.g., a facility hosted by a cloud computing system provider). The telemetry data can include information about the length of maintenance operations (e.g., software/hardware upgrades, cloud expansion/reconfiguration operations, manual virtual machine migrations, virtual machine cloning, virtual machine snapshot configuration, etc.) and the system configuration in place when such maintenance operations were performed. The telemetry data can also include information about which maintenance operations failed and a system configuration existing at the time when such maintenance operations failed. The telemetry data can be as rich as desired and can include any parameters selected by system administrators at the cloud computing systems or by system administrators at the cloud computing system provider.

In the example methods, systems, and apparatus disclosed herein, the example cloud computing system provider (also referred to as a cloud provider) hosts applications that analyze the information collected from all of the cloud computing systems either individually or in any combination. In some examples, the cloud provider includes performs the analyses using machine learning technology so that maintenance duration and maintenance risk estimates can be developed for any cloud configuration with greater accuracy. In some examples, the analyzer applications hosted by the cloud provider uses configuration information supplied by the individual cloud computing systems and information about past software/hardware upgrade operations performed by the individual cloud computing system to better predict how future upgrade operations will proceed. In some examples, the machine learning technology analyzes the collected information to determine how different parameters of a configuration affect the duration and risk of an operation to be performed. In some examples, the parameters relevant to each type of different operation vary. In some examples, the analyzer applications can retrieve model parameters from a model data store, apply a model on incoming data, publish the results to a datastore, retrieve historical data from multiple data centers, train new models using the data from all or many of the multiple data centers, compare different models, select a preferred model and store the selected model for future analyses.

In some examples, the central facility hosts applications that analyze the telemetry information to provide a report. In some examples, the report is made available quickly after the telemetry data is reported (e.g., in less than 10 minutes). In some examples, the telemetry data is transmitted to the central facility with a secret (e.g., a password, a passkey, a digital certificate, a pre-shared key, etc.). In addition to providing a report, the collected telemetry data is collected in a datastore (e.g., a database) for batch processing. In some examples, the batch processing periodically trains a machine learning model that is provided to the applications for analyzing the telemetry data to provide the report.

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

FIG. 1 is a block diagram of an example environment 100 in which a computing environment 110 operates. According to the illustrated example, the computing environment 110 is coupled, via a network 120, to an analytics analyzer 130 (e.g., a central facility). The example analytics analyzer 130 collects telemetry data from the example computing environment 110, analyzes the data, and provides reports regarding the analysis.

The example computing environment 110 is an SDDC that includes virtual computing component(s) 112 to provide virtual computing resources for executing a workload. According to the illustrated example, the computing environment 110 includes an analytics service 114 to collect and analyze information about the operation of the example virtual computing component(s) 112.

The computing environment 110 may include any combination of physical and virtual computing resources arranged in any configuration. According to the illustrated example, the environment 100 includes a plurality of computing environments 110. For example, the plurality of computing environments 110 may form a public or private cloud. Additionally or alternatively, the plurality of computing environments 110 may be any combination of linked and unlinked environments. For example, a group of the computing environments 110 may form a cloud run by a first entity while another of the computing environments 110 may be run by a second entity.

According to the illustrated example, the example virtual computing component(s) 112 are subsystems of a virtual computing environment for implementing the example computing environment 110. The example virtual computing component(s) 112 provide various services to provide functionality to the virtual computing environment 110. For example, the virtual computing component(s) 112 may provide virtual storage functionality, virtual networking functionality, distributed computing functionality, high availability functionality, etc. While the illustrated example includes multiple virtual computing components 112 to provide the various functionalities, a single virtual computing component may, alternatively, provide multiple functionalities to the computing environment 110. Additionally or alternatively, the virtual computing component(s) 112 may provide functionality to physical computing components (e.g., device management, device monitoring, networking connectivity, etc.). Likewise, the virtual computing component(s) may be implemented by hardware (e.g., a router, a gateway, a switch, a storage device, etc.), software, or any combination of hardware and software.

The example analytics service 114 collects telemetry information about operation of the example virtual computing component(s) 112 and transmits the telemetry information to the example analytics analyzer 130 via the example network 120. The telemetry information may include performance information (e.g., statistics, metrics, etc.) about the operation of the virtual computing component(s) 112, configuration of the virtual computing component(s) 112 (e.g., configuration settings, identification and configuration information about underlying hardware components, etc.), duration and success/failure information about maintenance operations (such as upgrades/reconfigurations), configuration information identifying different configurations in place at a same time that different maintenance duration and/or success/failure information was collected, and/or information corresponding to and/or any other aspect of the virtual computing component(s) 112.

According to the illustrated example, the analytics service 114 packages the collected telemetry into a structured format for transmission to the example analytics analyzer 130. The example analytics service 114 packages the telemetry information in Common Data Format (CDF) using JavaScript Object Notation (JSON). Alternatively, any other type of data structure may be utilized such as, for example, a key-value structure, an extensible markup language (XML) structure, etc. When sending the telemetry information to the example analytics analyzer 130, the example analytics service 114 includes a security component to ensure that the telemetry information and analysis results generated using the telemetry information are only available to the source analytics service 114 that transmitted the telemetry information. For example, the security component may be a password, a certificate (e.g., a digital certificate), a digital key, a secret, a pre-shared key, etc.

The example analytics service 114 determines the telemetry information to collect based on a configuration file (e.g., an XML configuration file). The example analytics service 114 retrieves the configuration file from the analytics analyzer 130 via the example network 120. By providing the configuration file from the analytics analyzer 130 the configuration file can be modified by system engineers, developers, etc. of the analytics analyzer 130 to control what telemetry information is collected. For example, if a developer at the cloud provider wishes to know how a particular virtual computing component 112 is operating on a particular storage device, the configuration file can be modified to include a request for the analytics service 114 to collect operation information for one of the virtual computing components 112 that provides a storage service and to collect identification information (e.g., model numbers) of storage devices in use. In some examples, the configuration file can initially include a first set of parameters to be collected in association with a particular type of maintenance/upgrade operation. For example, a configuration file associated with upgrading a set of ESXi hosts may specify that the first set of parameters to be collected include the ESX version of the ESXi hosts to be upgraded, a total amount of memory of the virtual machines associated with the ESXi hosts to be upgraded, and an L1 network bandwidth. (In some examples, the total amount of virtual machine memory can be estimated based on a number of virtual machines associated with the ESXi hosts to be upgraded multiplied by an average memory of the virtual machines included in a migration at the time of the last collection of batch data.) However, because the configuration file is modifiable, a system engineer, developer, administrator can modify the configuration file to further specify that information for an additional second set of parameters also be collected. The second set of parameters can include, for example, a number of ESXi host migrations to occur, and an effective network bandwidth between the hosts. Thus, instead of having to wait for a next upgrade to be released by a vendor of the cloud system, the users (e.g., the system engineers, developers, administrators, etc.) can specify parameters of interest by modifying the configuration file such that future risk and duration estimates can be based, at least in part, on the both the first and the second set of parameters.

The configuration file can also be generated and/or modified locally in the computing environment 110. In some examples, the analytics service 114 transmits a request for data analysis to the analytics analyzer 130. The request can include a request for an estimate of duration and/or risk of a proposed maintenance operation. In some examples, the analytics analyzer 130 may respond to such requests by requesting updated configuration and/or maintenance information. In some examples, the analytics analyzer 130 may respond to such requests by requesting configuration and/or maintenance data from other analytics services 114 associated with respective virtual computing environments 110 having configurations that are similar to the configuration associated with the analytics service 114 making the request for the estimate.

In some examples, the analytics analyzer 130 may transmit maintenance upgrades and/or reconfiguration information indicating that a software and/or hardware upgrade is recommended (or required) and may also transmit maintenance configuration recommendations to the analytics service 114. Such maintenance configuration recommendations may be made when the analytics analyzer 130 determines that a current configuration of the cloud computing environment is inefficient and that a reconfiguration operation would improve operating speed, available capacity and/or accessibility of the virtual computing resources. In some examples, information indicating that an upgrade or reconfiguration is recommended may include duration and/or risk estimates. In some examples, when duration and/or risk estimates are not included with an upgrade and/or reconfiguration recommendation, the analytic service 114 may request such estimates.

In addition to collecting telemetry information, the example analytics service 114 facilitates reporting on analysis of the telemetry information. For example, the analytics service 114 periodically polls the example analytics analyzer 130 using the security component used when transmitting telemetry information to determine if any analysis results, reports, etc. are available. When results and/or reports are available, the analytics service 114 retrieves the results and/or reports and presents them to a user (e.g., transmits the results and/or reports in a message, displays the results and/or reports, etc.). In some examples, the results/reports are used by the analytics service 114 to determine whether and/or when to schedule a maintenance operation.

The example network 120 of the illustrated example is the Internet. Alternatively, the network 120 may be any combination of public and private networks. For example, the network 120 may include one or more of public networks, private network, local area networks, wide area networks, virtual private networks, wired networks, wireless networks, etc.

The analytics analyzer 130 collects the telemetry information from the example analytics service 114 to provide streaming analysis and batch analysis. The example streaming analysis provides a rapid response (e.g., less than 1 second latency, less than 1 minute latency, etc.) by analyzing a particular telemetry information package received from the example analytics service 114. The example batch analysis analyzes multiple telemetry information packages (e.g., all telemetry information received from a particular one of the analytics service 114, all telemetry information received from a plurality of analytics services 114 associated with a particular one of the computing environments 110, all telemetry information received from all connected analytics services 114 (e.g., cross-deployment data from all clients of the analytics analyzer 130), etc.). According to the illustrated example, a machine learning model generated, trained, and/or retrained by the batch analysis is provided for use during the streaming analysis. As disclosed above, results from the analyses are provided to the example analytics service 114 (e.g., results of the streaming analysis of telemetry information received from one of the analytics service 114 are provided to that analytics service 114) and/or to other entities associated with the analytics analyzer 130 (e.g., streaming and/or batch analysis results may be provided to developers, administrators of the analytics analyzer 130, system engineers, etc.

In operation of the example environment 100, the example analytics services 114 retrieves a configuration file from the example analytics analyzer 130 via the example network 120. The example analytics service 114 collects the telemetry information identified/requested by the example configuration file and transmits the telemetry information and a secret to the example analytics analyzer 130 via the example network 120. The example analytics analyzer 130 utilizes a previously trained model to analyze the telemetry information (e.g., to determine if the telemetry information indicates an error, problem, misconfiguration, etc.) and generate a result. In some examples, the analytics service 114 polls the analytics analyzer 130 and provides the secret. When the result is available, the analytics service 114 is notified in response to the polling with the secret. The analytics service 114 retrieves the result. In the meantime, the telemetry information is also stored for use in the next batch analysis (e.g., to retrain the model).

Figure 2:
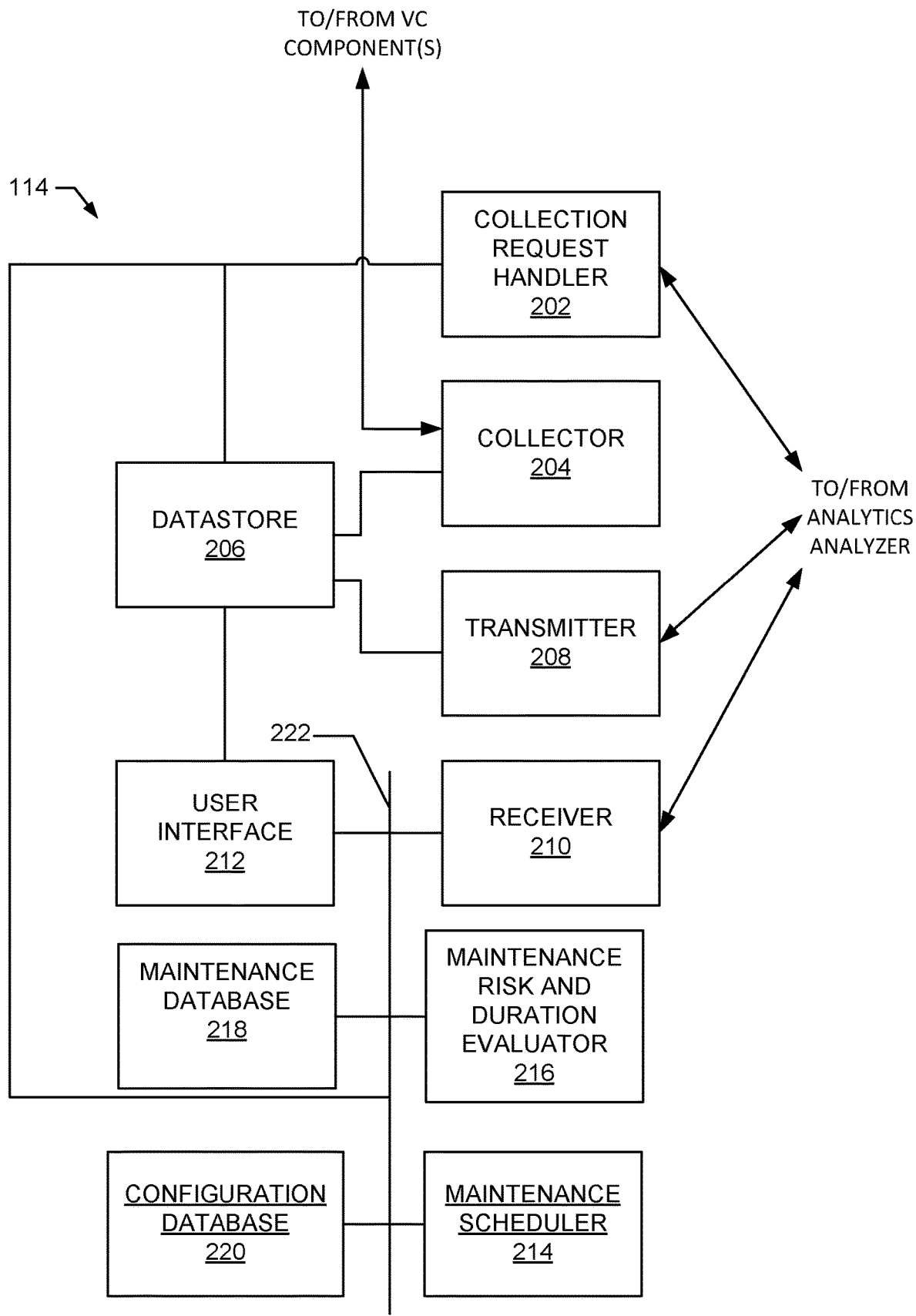
FIG. 2 is a block diagram of an example implementation of the analytics service of the cloud computing environment of FIG. 1.

FIG. 2 is a block diagram of an example implementation of the example analytics service 114 of FIG. 1. The example analytics service 114 of FIG. 2 includes an example collection request handler 202, an example collector 204, an example datastore 206, an example transmitter 208, an example receiver 210, and an example user interface 212, an example maintenance scheduler 214, an example maintenance and risk duration evaluator 216, an example maintenance database 218, and an example configuration database 220. In some examples, the maintenance database 218 and the configuration database 220 are implemented using the datastore 206. In some examples, the datastore 206, the receiver 210, the user interface 212, the maintenance scheduler 214, the maintenance risk and duration evaluator 216, the maintenance database 218, and/or the configuration database 220 are coupled via an example bus 222.

The example collection request handler 202 retrieves a configuration file and stores the configuration information in the example datastore 206. The collection handler 202 of the illustrated example retrieves the configuration file from the example analytics analyzer 130 of FIG. 1. Alternatively, the collection request handler 202 may retrieve the configuration file from another source and/or may present a user interface for a user to input configuration information to specify the telemetry information to be collected by the example collector 204.

The example collector 204 retrieves the configuration file from the example datastore 206 to determine what telemetry information is to be collected. Based on the configuration file, the example collector 204 interfaces with the example virtual computing component(s) 112 and/or any other software and/or hardware components to collect telemetry information. For example, the analytics service 114 may be integrated into the virtual computing component 112 to collect the telemetry information, may access an application programming interface (API) of the virtual computing component 112, etc. The example collector 204 stores the collected telemetry information in a structured format (e.g., CDF/JSON) in the example datastore 206.

The example datastore 206 is a storage device (e.g., a physical storage device and/or a virtual storage device). Alternatively, the datastore 206 may be any type of storage device and/or structure (e.g., a database, a file, a folder, a storage disk, storage memory, etc.).

The example transmitter 208 collects telemetry information stored in the example datastore 206 and transmits the telemetry information to the example analytics analyzer 130 via the example network 120. For example, the transmitter 208 may include a wired and/or wireless network interface. According to the illustrated example, the transmitter 208 transmits a secret stored in the datastore 206 to the analytics analyzer 130 with the telemetry information. For example, the secret may be unique to the example analytics service 114 to enable the analyzers analyzer 130 to segregate telemetry information and results to ensure privacy of the data.

The example receiver 210 polls the example analytics analyzer 130 using the secret to determine if analysis results are available. When the analysis results are available, the example receiver 210 retrieves the analysis results from the example analytics analyzer 130. The example receiver 210 provides the analysis results to the user interface 212. Alternatively, the receiver 210 may store the analysis results in the example datastore 206.

The example user interface 212 of FIG. 2 outputs a display of the analysis results. In some examples, the user interface 212 may additionally retrieve telemetry information from the datastore 206 (e.g., the telemetry information that was analyzed to generate the analysis results).

The example maintenance scheduler 214 is a maintenance scheduling tool that is used by a system administrator to schedule maintenance operations. In some examples, the maintenance scheduler 214 accesses maintenance history information stored in the example maintenance database 218, telemetry data stored in the example datastore 206, and/or configuration data stored in the example configuration database 220 to identify and/or track maintenance operations that are to be scheduled. In some examples, the maintenance scheduler 214 transmits, to the example maintenance risk and duration evaluator 216, a request for an estimate of the duration and/or risk associated with a particular maintenance operation. Based on a response received from the maintenance risk and duration evaluator 216, the maintenance scheduler 214 can identify possible maintenance windows for performing the maintenance operation. A system administrator can access the maintenance scheduler 214 via the user interface 212 to select a desired maintenance window or review the duration and risk information to determine whether such a maintenance operation will be performed.

The example maintenance risk and duration evaluator 216 responds to requests for risk and duration information received from the maintenance scheduler 214 and/or proactively scans the maintenance database 218 and develops risk and duration information for a set of upcoming maintenance operations stored therein. In some examples, the maintenance risk and duration evaluator 216 may determine whether a computing environment configuration change has occurred between a current time and a previous time at which a same or similar maintenance operation was performed. In some examples, the maintenance risk and duration evaluator 216 determines whether the configuration has changed based on information stored in the configuration database. In some examples, the maintenance risk and duration evaluator 216 determines whether a configuration change is insignificant and unlikely to affect the risk and/or duration evaluation or whether the change is significant and likely to affect the risk and/or duration evaluation minor. In some examples, when the change is insignificant, the maintenance risk and duration evaluator 216 may rely on past history information stored in the maintenance database 218. In some examples, when the change is significant, the maintenance risk and duration evaluator 216 transmits a request to the analytics analyzer 130 identifying the current configuration of the virtual computing environment and asking for a duration and/or risk estimate.

While an example manner of implementing the analytics service 114 of FIG. 1 is illustrated in FIG. 2, one or more of the elements, processes and/or devices illustrated in FIG. 2 may be combined, divided, re-arranged, omitted, eliminated and/or implemented in any other way. Further, the example collection request handler 202, the example collector 204, the example datastore 206, the example transmitter 208, the example receiver 210, the example user interface 212, the example maintenance scheduler 214, the example maintenance risk and duration evaluator 216, the example maintenance database 218, the example maintenance database 218, the example configuration database 220, and/or more generally, the example analytics service 114 of FIG. 2 may be implemented by hardware, software, firmware and/or any combination of hardware, software and/or firmware. Thus, for example, any of the example collection request handler 202, the example collector 204, the example datastore 206, the example transmitter 208, the example receiver 210, the example user interface 212, the example maintenance scheduler 214, the example maintenance risk and duration evaluator 216, the example maintenance database 218, the example maintenance database 218, the example configuration database 220, and/or more generally, the example analytics service 114 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection request handler 202, the example collector 204, the example datastore 206, the example transmitter 208, the example receiver 210, the example user interface 212, the example maintenance scheduler 214, the example maintenance risk and duration evaluator 216, the example maintenance database 218, the example maintenance database 218, the example configuration database 220, and/or more generally, the example analytics service 114 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example analytics service 114 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
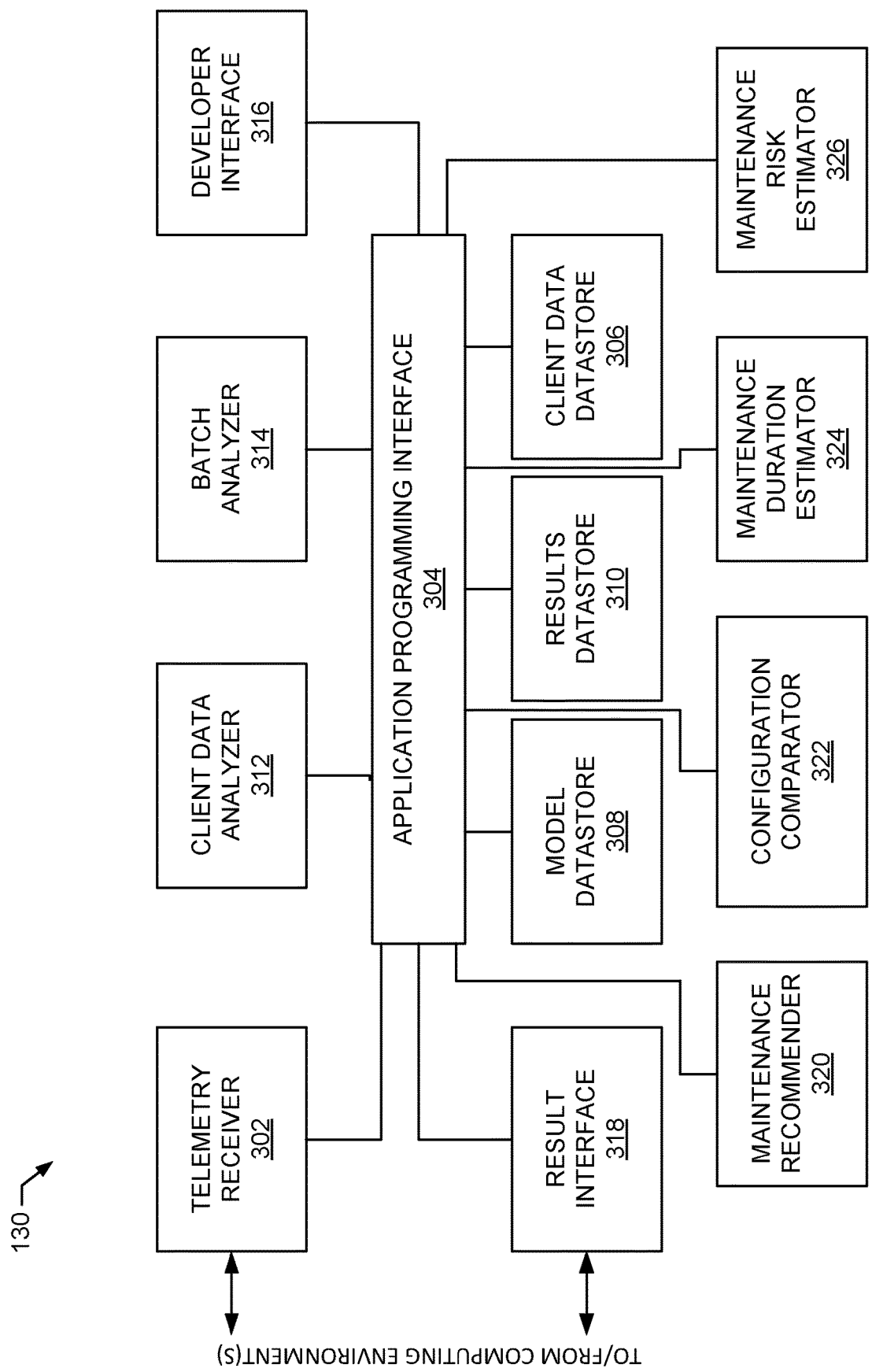
FIG. 3 is a block diagram of an example implementation of the analytics analyzer of FIG. 1.

FIG. 3 is a block diagram of an example implementation of the analytics analyzer 130 of FIG. 1. The example analytics analyzer 130 of FIG. 2 includes an example telemetry receiver 302, an example application programming interface 304, an example client data datastore 306, an example model datastore 308, an example results datastore 310, an example client data analyzer 312, an example batch analyzer 314, an example developer interface 316, an example result interface 318, an example maintenance recommender 320, an example configuration comparator 322, an example maintenance duration estimator 324, and an example maintenance risk estimator 326.

The example telemetry receiver 302 is a network interface that receives telemetry data from the example analytics service 114. The telemetry receiver 302 of the illustrated example stores the received telemetry data in the example client data datastore 306 via the application programming interface 304. According to the illustrated example, the telemetry receiver 302 parses the data from the structured telemetry data to generate key-value pairs and stores the key-value pairs with any secret that is received from the analyzers service 114. The telemetry receiver 302 of the illustrated example is a web interface that receives hypertext transport protocol (HTTP) requests and posts. Alternatively, the telemetry receiver 302 may be any other type of interface.

The example application programming interface 304 is a representational state transfer (REST) API that facilitates storage and retrieval of data from the example client data datastore 306, the example model datastore 308, and the example results datastore 310. Alternatively, the application programming interface 304 may implement any other type of API. In some examples, the analytics analyzer 130 may not include an application programming interface and the databases may be accessed directly.

The example client data datastore 306 is a database for storing received telemetry data for processing by the client data analyzer 312 and the batch analyzer 314. The example model datastore 308 is a database for storing models (e.g., machine learning models) generated by the example batch analyzer 314. The example results datastore 310 is a database for storing analysis results from the example client data analyzer 312. While the example client data datastore 306, the example model datastore 308, and the example results datastore 310 are databases in the illustrated example, one or more of the client data datastore 306, the model datastore 308, and the results datastore 310 may be implemented by any type of datastore and/or data structure. In some examples, the client data store 306, the model datastore 308, and/or the example results datastore 310 includes configuration data that identifies the configurations of the virtual computing environments from which telemetry data is collected and/or results data has been generated.

The example client data analyzer 312 is an application that processes telemetry data received from the example analyzers service 114. The example client data analyzer 312 retrieves new telemetry data from the example client data datastore, analyzes the data using a model retrieved from the example model datastore 308, and stores the results in the results datastore 310 in association with a secret of the analyzer service 114 (if one was received). The example client data analyzer may be implemented by a set of applications that are focused on particular analyses (e.g., applications that analyze telemetry data from particular ones of the virtual computing components 112). In some such examples, the client data analyzer 312 may include an application that analyzes data for a virtual storage area network one of the virtual computing components 112. In some such examples, the client data analyzer 312 may include an application that analyzes maintenance operation data for any of a variety of maintenance operations performed in connection with any of a variety of computing system configurations.

According to the illustrated example, the client data analyzer 312 processes received data quickly to reduce latency (e.g., in under 1 second, in under 1 minutes, in under 1 hour, etc.). To provide a rapid response, the example client data analyzer 312 performs streaming analysis on received telemetry data. In other words, the client data analyzer 312 analyzes a package of telemetry data as it is received instead of bundling telemetry data over time. Alternatively, the client data analyzer 312 may collect telemetry data for a period of time (e.g., telemetry data from a single analytics service 114, telemetry data from a plurality of analytics services 114 associated with a single entity, etc.).

The example batch analyzer 314 retrieves stored telemetry data from the example client data datastore 306 and analyzes the data to train a model (e.g., a machine learning model). For example, the model may be a predictor model (e.g., to predict an error condition, a misconfiguration condition, a duration of time to complete a maintenance operation, a risk associated with performing a maintenance operation, etc.) and/or the model may be a detector model (e.g., to indicate a current error condition, to indicate a current misconfiguration, etc.), or any other type of model. According to the illustrated example, the batch analyzer 314 analyzes telemetry data collected over a period of time (e.g., an hour, a day, a week, or any other shorter or longer period of time) and collected from a plurality of analytics services 114 (e.g., a plurality of analytics services 114 from a single entity, a plurality of analytics services 114 associated with a plurality of entities, etc.). Because the example batch analyzer 314 is not relied upon for real-time results, the batch analyzer 314 can perform a more detailed analysis and operate on a larger amount of data than the example client data analyzer 312.

According to the illustrated example, the batch analyzer 314 stores a generated/trained/retrained model in the example model datastore 308 via the application programming interface 304 for retrieval by the example client data analyzer 312.

The developer interface 316 of the illustrated example provides an interface for querying the telemetry data stored in the example client data datastore 306 and/or analysis results stored in the example results datastore 310. The example developer interface 316 includes user level security to control user access to the information. According to the illustrated example, the developer interface 316 provides a first security level that provides access to anonymized information and a second security level that provides access to information that identifies the source (e.g., the source of the telemetry data). For example, the developer interface 316 may be accessed by developers of the virtual computing components 112, which may be provided with anonymized information that allows for the developers to understand how the virtual computing components 112 are operating in the field. Users at a higher level (e.g., management, customer service, etc.) may be provided with permissions that allow access to information with identification information included.

In one example scenario, a developer of a virtual storage area networking virtual computing component 112 may analyze operation information to determine hardware compatibility by querying the client data datastore 306 and the results datastore 310 for information about computing environments 110 that include a particular piece of hardware for which compatibility information is desired. The results datastore 310 may reveal that installations that include the particular piece of hardware are experiencing greater number of errors, reducing performance, etc., thus, indicating incompatibility.

In another example scenario, a developer of a virtual storage area networking virtual computing component 112 may analyze maintenance operation information to determine how long the corresponding maintenance operation is likely to take to complete by querying the client data datastore 306 and the results datastore 310 for information about one or more of the computing environments 110 that include a particular piece of hardware, a particular software configuration, a particular hardware configuration, etc. The results datastore 310 may reveal that the maintenance operation takes a longer duration of time to complete for some types of configurations and a shorter duration of time to complete for other types of configurations. The results datastore 310 may also reveal that the maintenance operation is a high risk operation (e.g., with a significant likelihood of failure) for some types of configurations and a low risk operation for other types of configurations.

The example result interface 318 receives polling queries from the example analytics service 114, determines if relevant results are stored in the example results datastore 310 via the example application programming interface 304, and returns the results to the example analytics service 114. According to the illustrated example, the analytics service 114 provides a secret when polling and the result interface 318 only returns results that are stored with a matching secret in the example results datastore 310.

The example result interface 318 provides a configuration file for retrieval by the example analytics service 114. For example, the configuration file may be configured by developers (e.g., via a user interface provided by the example developer interface 316) and stored in the example results datastore 310. The example analytics service 114 may periodically check for an updated configuration file that instructs the analytics service 114 about what telemetry data to collect. In some examples, the configuration file is designed to capture include configuration information about the configuration of the client's virtual computing environment. In some examples, the configuration file is designed to capture maintenance operation information including the duration of past maintenance operations, a computing environment configuration in place at the time at which the maintenance operation was performed, information indicating whether the maintenance operation was successful, etc.

The example maintenance recommender 320 recommends maintenance operations for the client computing environments 110. In some examples, the recommendations are based on the configuration of the client computing environments 110, the software included in the client computing environments 110, the hardware included in the client computing environments 110, etc. In some examples, the maintenance recommender 320 identifies software patches or operation system software upgrades to be installed. In some examples, the maintenance recommender determines that a particular computing environment 110 has a configuration that is inefficient and will perform better if reconfigured. In some examples, the maintenance recommender 320 accesses the client data store 306 and/or the results data store 310 to identify the results of previous maintenance operation analyses performed for the client computing environments and/or to identify the configuration information for the client computing environments.

The example configuration comparator 322 compares a current configuration of a client computing environment 110 to configurations of other client computing environments 110 to identify similar computing environments. In some examples, when a similar computing environment is identified, the configuration comparator identifies the client computing environment having the similar configuration to the maintenance duration estimator 324 and/or the maintenance risk estimator 326.

The example maintenance duration estimator 324 estimates a duration of a maintenance operation for any of the client computing environments 110. In some examples, the maintenance duration estimator 324 estimates the duration of a maintenance operation by accessing a model stored in the model datastore 308 that corresponds to the maintenance operation. In some examples, the maintenance duration estimator 324 estimates the duration of a maintenance operation by accessing the results datastore 310 and/or the client datastore 306. In some examples, the maintenance duration estimator 324 obtains maintenance operation duration data developed for a similar configuration based on a similar configuration identified by the example configuration comparator 324. In some examples, a same model (stored in the model datastore 308) for a maintenance operation is used for all configurations such that the specific configuration of a client computing environment need not be considered when making the duration estimate.

The example maintenance risk estimator 324 estimates a success/failure risk of performing a maintenance operation for any of the client computing environments 110. In some examples, the maintenance risk estimator 324 estimates the risk of a maintenance operation by accessing a model stored in the model datastore 308 that corresponds to the maintenance operation. In some examples, the maintenance risk estimator 324 estimates the success/failure risk of a maintenance operation by accessing the results datastore 310 and/or the client datastore 306. In some examples, the maintenance risk estimator 324 obtains maintenance operation risk data developed for a similar configuration based on a similar configuration identified by the example configuration comparator 324. In some examples, a same model (stored in the model datastore 308) for a maintenance operation is used for all configurations such that the specific configuration of a client computing environment need not be considered when making the risk estimate.

While an example manner of implementing the analytics analyzer 130 of FIG. 1 is illustrated in FIG. 3, one or more of the elements, processes and/or devices illustrated in FIG. 3 may be combined, divided, re-arranged, omitted, eliminated and/or implemented in any other way. Further, the example telemetry receiver 302, the example application programming interface 304, the example client data datastore 306, the example model datastore 308, the example results datastore 310, the example client data analyzer 312, the example batch analyzer 314, the example developer interface 316, the example result interface 318, the example maintenance recommender 320, the example configuration comparator 322, the example maintenance duration estimator 324, the example maintenance risk estimator 326 and/or, more generally, the example analytics analyzer 130 of FIG. 1 may be implemented by hardware, software, firmware and/or any combination of hardware, software and/or firmware. Thus, for example, any of the example telemetry receiver 302, the example application programming interface 304, the example client data datastore 306, the example model datastore 308, the example results datastore 310, the example client data analyzer 312, the example batch analyzer 314, the example developer interface 316, the example result interface 318, the example maintenance recommender 320, the example configuration comparator 322, the example maintenance duration estimator 324, the example maintenance risk estimator 326 and/or, more generally, the example analytics analyzer 130 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example telemetry receiver 302, the example application programming interface 304, the example client data datastore 306, the example model datastore 308, the example results datastore 310, the example client data analyzer 312, the example batch analyzer 314, and/or the example developer interface 316, the result interface 318, the example result interface 318, the example maintenance recommender 320, the example configuration comparator 322, the example maintenance duration estimator 324, and/or the example maintenance risk estimator 326, is/are hereby expressly defined to include a non-transitory computer readable storage device or storage disk such as a memory, a digital versatile disk (DVD), a compact disk (CD), a Blu-ray disk, etc. including the software and/or firmware. Further still, the example analytics analyzer 130 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
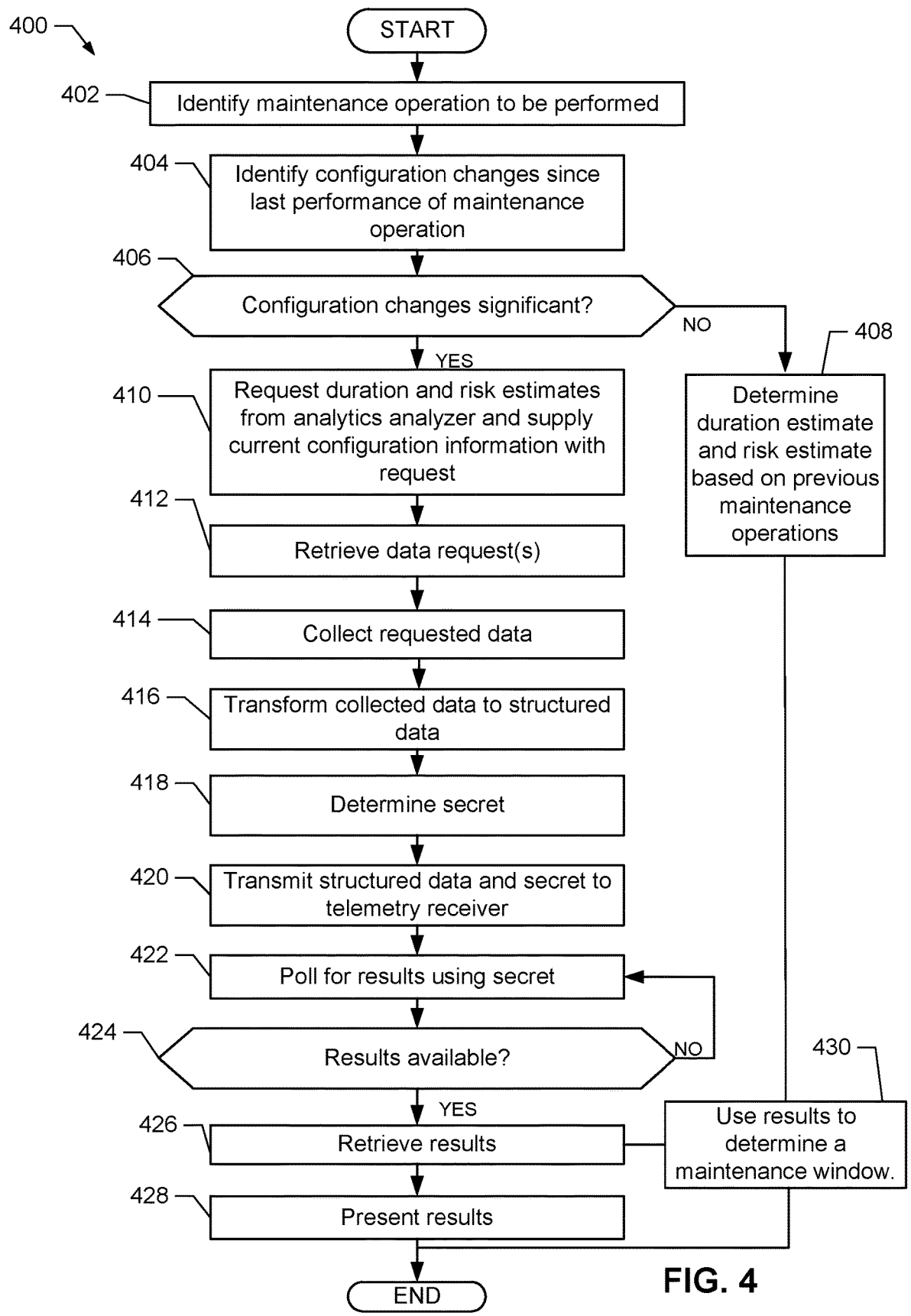
FIG. 4 is a flowchart representative of machine readable instructions which may be executed to implement the example analytics service of FIG. 1 and/or FIG. 2.

A flowchart representative of example hardware logic or machine readable instructions for implementing the analytics service 114 of FIG. 1 and/or FIG. 2 is shown in FIG. 4. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example analytics service 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 400 of FIG. 4 begins at block 402 when the example maintenance scheduler 214 (see FIG. 2) identifies a maintenance operation (or a configuration operation) to be performed. The maintenance operation can include preparing the infrastructure for maintenance or upgrade, manual virtual machine migration, cloning and generation or management of virtual machine snapshots. In some examples, the maintenance scheduler identifies a maintenance operation to be performed in response to a maintenance recommendation received from the analytics server 130. In some examples, the analytics server 130 identifies a software or hardware upgrade to be performed and the maintenance scheduler identifies additional maintenance operations to be performed in support of the upgrade. In some examples, the example maintenance scheduler 214 consults the maintenance database to identify maintenance operations to be performed. In some examples, the maintenance scheduler 214 identifies the maintenance operation to the example maintenance risk and duration evaluator 216 (also at the block 402).

In some examples, the example maintenance risk and duration evaluator 216 uses the information supplied by the example maintenance scheduler 214 to consult the example maintenance database 218 to determine a last time the identified maintenance operation was performed and then consults the example configuration database 220 (see FIG. 2) to identify configuration changes that occurred between the last time and a current time (block 404). The maintenance risk and duration evaluator 216 also determines whether the identified configuration changes were significant (block 406). The maintenance risk and duration evaluator 216 may determine whether the identified configuration changes were significant based on any of a variety of factors including the type of maintenance operation to be performed and parameters of the configuration change. In some examples, the maintenance risk and duration evaluator 216 evaluates different parameters of the configuration changes for different types of maintenance/upgrade operations. In some examples, when evaluating the duration and risk of an upgrade of ESXi hosts, the maintenance risk and duration evaluator 216 considers parameters including: ESX version of the hosts to be upgraded, a number of hosts to be migrated, a total amount of memory of virtual machines associated with the hosts to be upgraded, an amount of network bandwidth available to the hosts to be upgraded, and an effective network bandwidth between the hosts to be upgraded, etc. In some examples, when evaluating the duration and risk of cloning a virtual machine, the maintenance risk and duration evaluator 216 considers parameters including: a number of virtual machine disks, a total size of the virtual machine disks, a total number of virtual machine snapshots, a number of snapshots per disk and an Input/Output bandwidth of the virtual machine, etc. A virtual machine disk is a file format that describes containers for virtual hard disk drives used in virtual machines.

In some examples, the changes are not significant such that the maintenance risk and duration evaluator 216 determines the duration estimate and/or a risk estimate for performing the identified maintenance operation based on the success/failure and duration of previously performed maintenance operations that are either identical or similar operations (block 408). In some examples, the changes are significant such that the maintenance risk and duration evaluator 216 requests that the analytics analyzer 130 generate a duration estimate and/or a risk estimate based on a training model developed using estimate/risk data generated for similar maintenance operations performed at other computing environments 110 (block 410).

In some examples, after sending the request to the analytics analyzer 130, the maintenance risk and duration evaluator 216 retrieves a configuration file with data request(s) information from the example analytics analyzer 130. The configuration file identifies information to be collected by the computing environment for use in generating a response to the request for a risk and duration estimate. In some examples, the analytics analyzer 130 transmits the configuration file in response to the request. The example collector 204 collects the telemetry data requested by the configuration file from the example virtual computing components 112 (block 404). The collected telemetry data can include system configuration data deemed relevant to the duration and risk analysis, information concerning the past performance of similar or the same maintenance operation, any desired system parameters, etc. The example collector 204 transforms the collected telemetry data into structured data and stores the data in the example datastore 206 (block 406).

The example transmitter 208 then determines a secret associated with the example analytics service 114 (block 408). For example, the secret may be stored in the datastore 206, may be input by a user, etc. The transmitter 208 then transmits the structured data and the secret to the telemetry receiver 302 of the example analytics analyzer 130 (block 410). After the transmitter 208 transmits the data, the example receiver 210 transmits a polling request to the analytics analyzer 130 using the secret (block 412). The example receiver 210 determines if a response indicates that results are available (block 414). If the response indicates that results are not yet available, control returns to block 412 to poll for the request again (e.g., after a period of time has passed (e.g., a second, a minute, etc.)).

If the polling indicates that results are available (block 414), the example receiver 210 retrieves the results (block 416). The results can include a duration estimate for the maintenance operation and/or a risk of success/failure estimate for the maintenance operation. In examples, in which the risk of failure is high, the results may further include ways to reconfigure the system to lower the risk of failure. The example user interface 212 then presents the results (block 418). For example, the user interface 212 may present the duration estimate for the maintenance operation and/or the risk of success/failure for the maintenance operation. In some examples, when the results include an error condition, a recommendation to perform an upgrade or perform a configuration change, the user interface 212 may sound an alarm or flash a light. In some examples, the example maintenance scheduler 214 uses the results (whether provided by the analytics analyzer 130 (block 426) or the maintenance risk and duration evaluator 216 (block 408)) to identify one or more maintenance windows in which the maintenance operation can be performed (block 430).

The example process of FIG. 4 then ends. Alternatively, control may return to block 402 to when a next maintenance operation is identified, control may return to block 404 to collect additional telemetry data, and/or control may return to block 422 to poll for another set of results.

Figure 5:
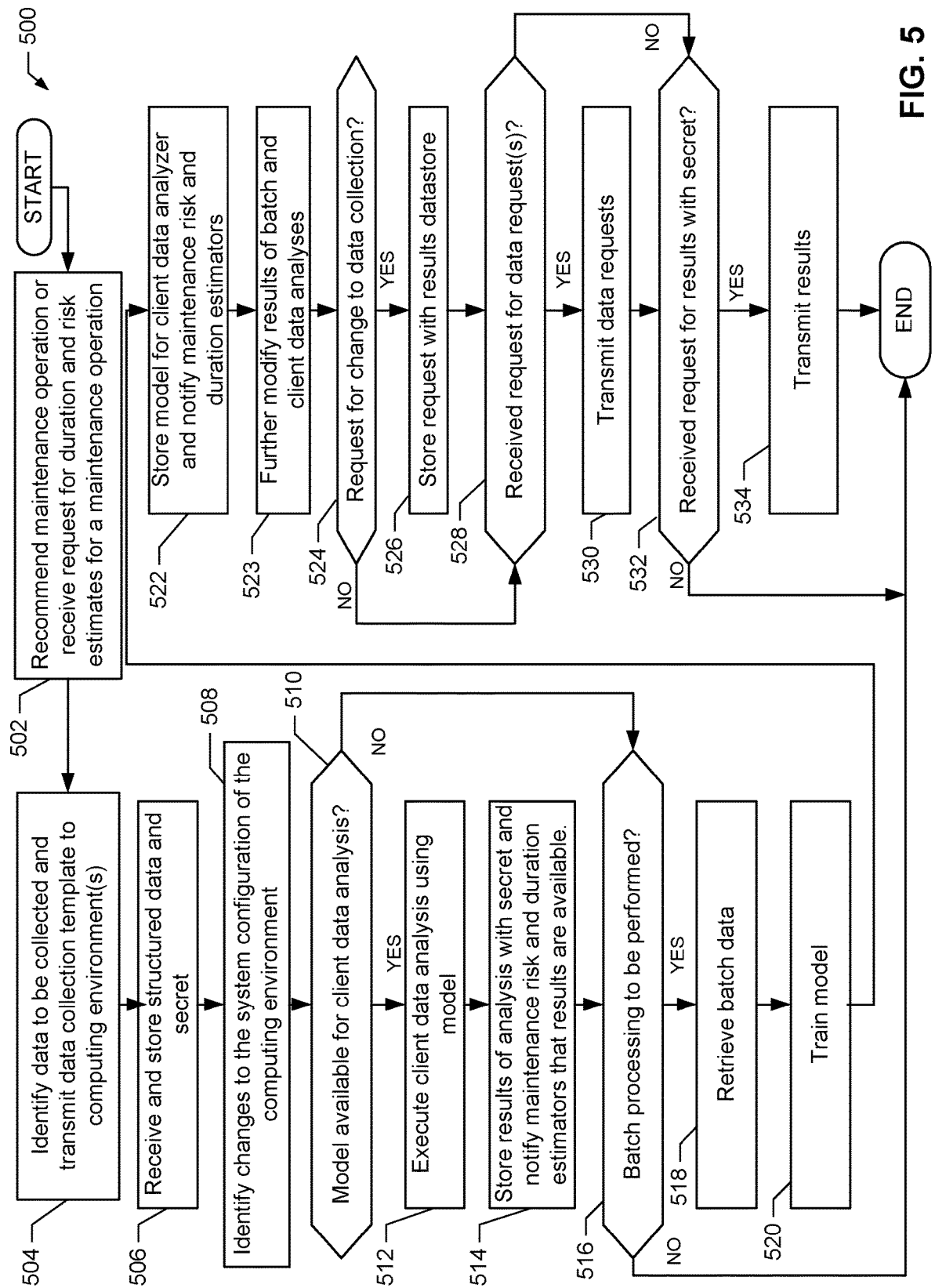
FIG. 5 is a flowchart representative of machine readable instructions which may be executed to implement the example analytics analyzer of FIG. 1 and/or FIG. 3.

A flowchart representative of example hardware logic or machine readable instructions for implementing the analytics analyzer 130 of FIG. 1 and/or FIG. 3 is shown in FIG. 5. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example analytics analyzer 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 500 of FIG. 5 begins at block 502 when either the example maintenance recommender 320 transmits, to the example computing environment 110, a recommendation to perform a maintenance operation, or a request for a risk and/or duration estimate is received at the telemetry receiver 302 from the computing environment 110 and transmitted to one or both of the example maintenance duration estimator 324 and/or the example maintenance risk estimator 326. Whether sending a recommendation or receiving a request for a duration and/or risk estimate, the maintenance risk estimator 326 and/or the maintenance duration estimator 324 identifies data to be collected from the computing environment in a configuration file that is transmitted to the computing environment 110 (block 504). In some examples, configuration information may have been included with the request for a duration and/or risk estimate received from the computing environment. In some such examples, the maintenance risk estimator 326 and/or the maintenance duration estimator 324 takes the received information into consideration when determining which and what types of information is to be collected via the configuration file.

At a block 506 the example telemetry receiver 302 receives and stores the structured data received from the computing environment in the configuration file format and a first secret. The structured data is received responsive to the sending of the configuration file to the computing environment 110. The example telemetry receiver 302 stores the structured data in association with the first secret in the example client data datastore 306 via the example application programming interface 304 (block 504). In some examples, system configuration data identifying a configuration of the computing environment 110 is collected and stored with the secret. In some examples, information concerning the amount of time required to complete the same or similar maintenance operations in the past is collected and stored with the secret. In some examples, received system configuration is stored with the secret.

The example configuration comparator 322 responds the storage of new configuration data comparing the current configuration (identified in the newly stored configuration data) to a configuration that was present when a same or similar maintenance operation was performed at an earlier time (block 508). The results of the configuration comparison are then used by the example client data analyzer 312 to determine if a training model is available for the maintenance operation that is suited to the system configuration changes identified by the configuration comparator 322 (block 510). In some examples, the client data analyzer 312 makes the determination by consulting the model datastore 308. In some such examples, the model datastore 308 includes training models that correspond to various maintenance operations and that further correspond to maintenance operations performed in systems having different system configurations.

When a suitable model is not available, control proceeds to block 516, which is described below. When a suitable model is available, the example client data analyzer 312 retrieves the received telemetry data (which can include a maintenance operation identifier that identifies the maintenance operation, system configuration information, information concerning the duration of the same or similar operations performed in the past, the success rate of such operations, etc.) from the example client data datastore 306 and the appropriate model from the example model datastore 308 via the example application programming interface 304 and executes a client data analysis on the telemetry data using the appropriate model (block 512). For example, the client data analyzer 312 selects a model associated with the source of the telemetry data. The model may be a machine learning model which the client data analyzer 312 applies to the telemetry data to determine a result (e.g., to determine a duration of the maintenance operation, a risk of failure of the operation, an error prediction, to determine a configuration error, to determine a hardware compatibility issue, to confirm stable operation, etc.). In some examples, the machine learning models are configured to learn, from batch data, how different configuration parameters affect the duration and risk of an operation to be performed. The configuration parameters to be evaluated in connection with different types of operations to be performed can vary. In some examples, a standard linear regression is performed to develop a first model and then subsequently, the first model is updated (or learns) from additionally collected data. The data used in the standard linear regression may take into consideration system parameters such as ESX version of the processors of the system, a number of VMs, a total amount of VM memory, a physical network bandwidth, etc. In some examples, as the amount of historical data collected from different data centers increases, the batch data analyzer 314 may use the historical data to develop multiple models and then select a preferred one of the models to be used for future analyses.

The example client data analyzer 312 stores the analysis results in association with the first secret in the example results datastore 310 and notifies the example maintenance risk estimator 326 and the example maintenance duration estimator 324 that the results are available (block 514).

The example batch analyzer 314 determines if batch processing is to be performed (block 512). For example, batch processing may be performed in response to determining that a new model for a newly identified configuration is needed, to determining that a model has reached a threshold age, to determining that a threshold amount of new telemetry data has been received, to determining that a time has elapsed, to determining that a trigger time has arrived, etc. When batch processing is not to be performed, the process of FIG. 5 ends or control returns to block 502 to await further telemetry data and/or requests for maintenance operation durations/risk estimates.

When batch processing is to be performed (as determined at the block 516), the example batch analyzer 314 retrieves stored batch data from the example client data datastore 306 (block 518). For example, the stored data may include telemetry data that has been previously analyzed by the example client data analyzer 312 as well as any newly received telemetry data. The data may be data from a single entity or a plurality of entities. For example, when attempting to identify hardware compatibility issues, it may be helpful to analyze data from many entities to increase the number of instances of a particular hardware configuration and to reduce the possibility of issues that are unique to a configuration configured by a single entity.

The example batch analyzer 314 trains a model using the retrieved batch data (block 520). For example, the training may be unsupervised training using non-labeled data, and/or supervised training using labeled data (e.g., data that is labeled with error conditions that are detected by the analytics service 114 and/or identified by users), or any other type of training. The example training may generate a new model, train an existing model, retrain an existing model (e.g., replace the model rather than update the model), etc. As described above, in some examples, a standard linear regression is performed to develop a first model for a maintenance operation and/or configuration change and then subsequently, the first model is updated (or learns) from additionally collected data. In some examples, as the amount of historical data collected from different data centers increases, the batch data analyzer 314 may use the historical data to develop multiple models and then select a preferred one of the models to be used for future analyses. Using retraining to develop smarter and better models provides results in more accurate durational and risk estimates over time.

After training the model (at the block 520), the example batch analyzer 314 stores the model, for use by the example client data analyzer 312, in the example model datastore 308 via the example application programming interface 304 (block 522). Also at the block 522, the batch analyzer 314 notifies one or both of the example maintenance duration estimator 324 and the example maintenance risk estimator 326 that the results have been stored.

Either or both of the example maintenance duration estimator 324 and the example maintenance risk estimator 326 respond to the storage of the results (at the block 514 and/or the block 522) by further analyzing the results to determine whether additional information is to be added to the results (a recommendation to forego the maintenance operation, a recommendation to perform software upgrades or hardware replacements before the maintenance operation is performed, a recommendation to reconfigure one or more clusters in a particular manner before the maintenance operation is performed, etc.) (block 523).

The example result interface 318 determines if a request for a change to data collections has been received (block 524). For example, a developer may submit a request via the developer interface 316 for additional or alternative data to be collected in the telemetry data by the example analytics service 114. When there are no requested changes, control proceeds to block 528. When a request for changes is received, the example results datastore 310 stores the data request (e.g., updates one or more configuration files that are to be supplied to and/or retrieved by the example analytics service 114) (block 526).

The example result interface 318 determines if a request has been received for data request information (e.g., for the configuration file) (block 528). When a request has not been received, control proceeds to block 532. When a request has been received, the example result interface 318 retrieves the configuration file identifying data request information from the example results datastore 310 and transmits the configuration file to the source of the request (block 530).

The example result interface 318 determines if a request for analysis results has been received with a second secret (block 532). When a request has not been received, the process of FIG. 5 terminates or control returns to another block to continue processing. When a request has been received, the example result interface 318 retrieves results associated with the identified second secret (e.g., the results associated with the first secret when the result interface 318 determines that the second secret matches the first secret) and transmits the results to the source of the request (block 534). The process of FIG. 5 then terminates or control returns to another block to continue processing.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 6:
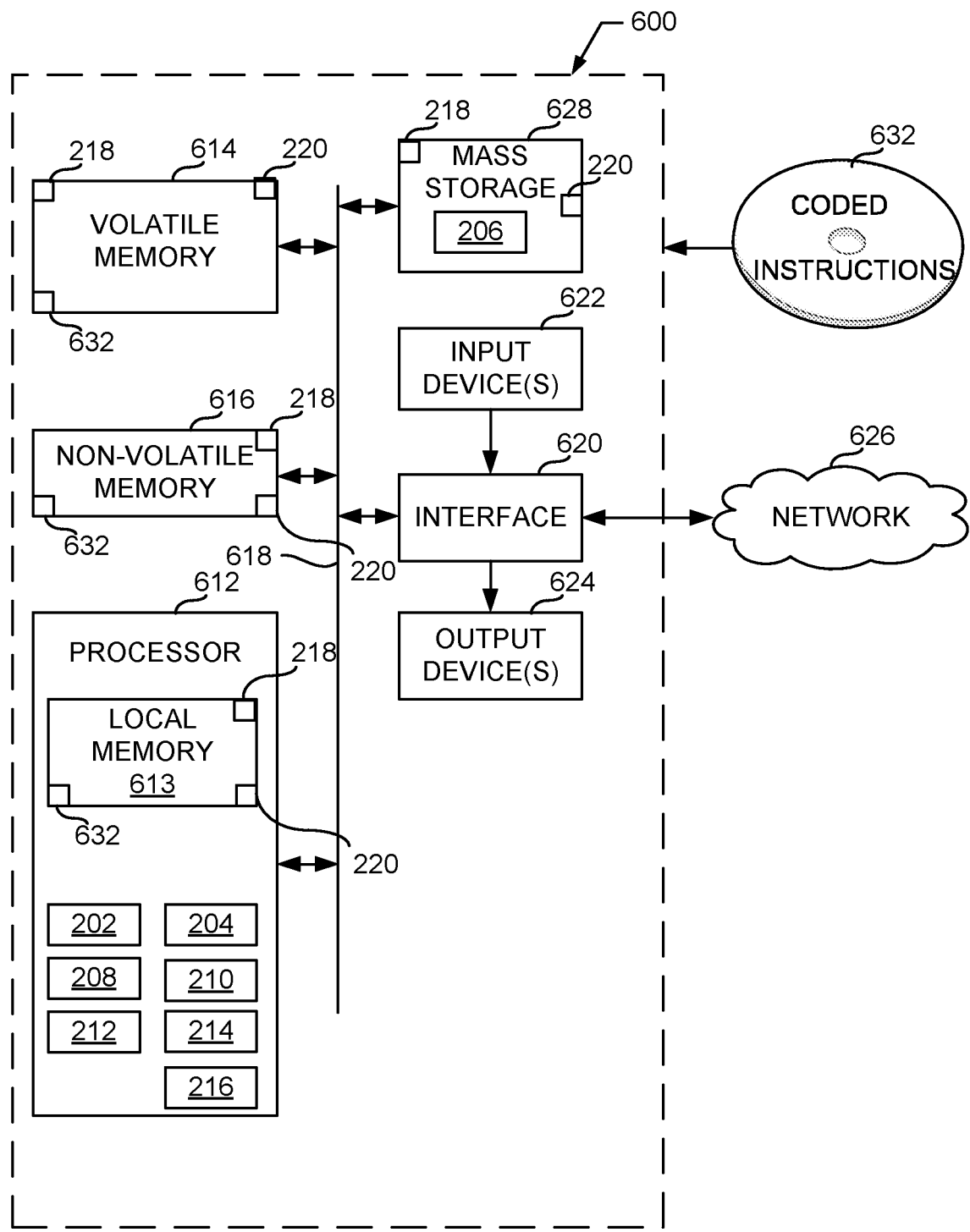
FIG. 6 is a block diagram of an example processing platform structured to execute the instructions of FIG. 4 to implement the example analytics service of FIG. 1 and/or FIG. 2.

FIG. 6 is a block diagram of an example processor platform 600 structured to execute the instructions of FIG. 4 to implement the analytics service 114 of FIG. 1 and/or FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example collection request handler 202, the example, collector 204, the example transmitter 208, the example receiver 210, the example user interface 212, the example maintenance scheduler 214, and the example maintenance risk and duration evaluator 216.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. In this example, any of the local memory, volatile memory and the non-volatile memory can be used to implement the example datastore 206, the example maintenance database 218, and the example configuration database 220.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. The example mass storage 628 can includes the example datastore 206, the example configuration database 220, and the example maintenance database 218.

The machine executable instructions 632 of FIG. 4 may be stored in the mass storage device 628, in the volatile memory 614, in the non-volatile memory 616, and/or on a removable non-transitory computer readable storage medium such as a CD or DVD.

Figure 7:
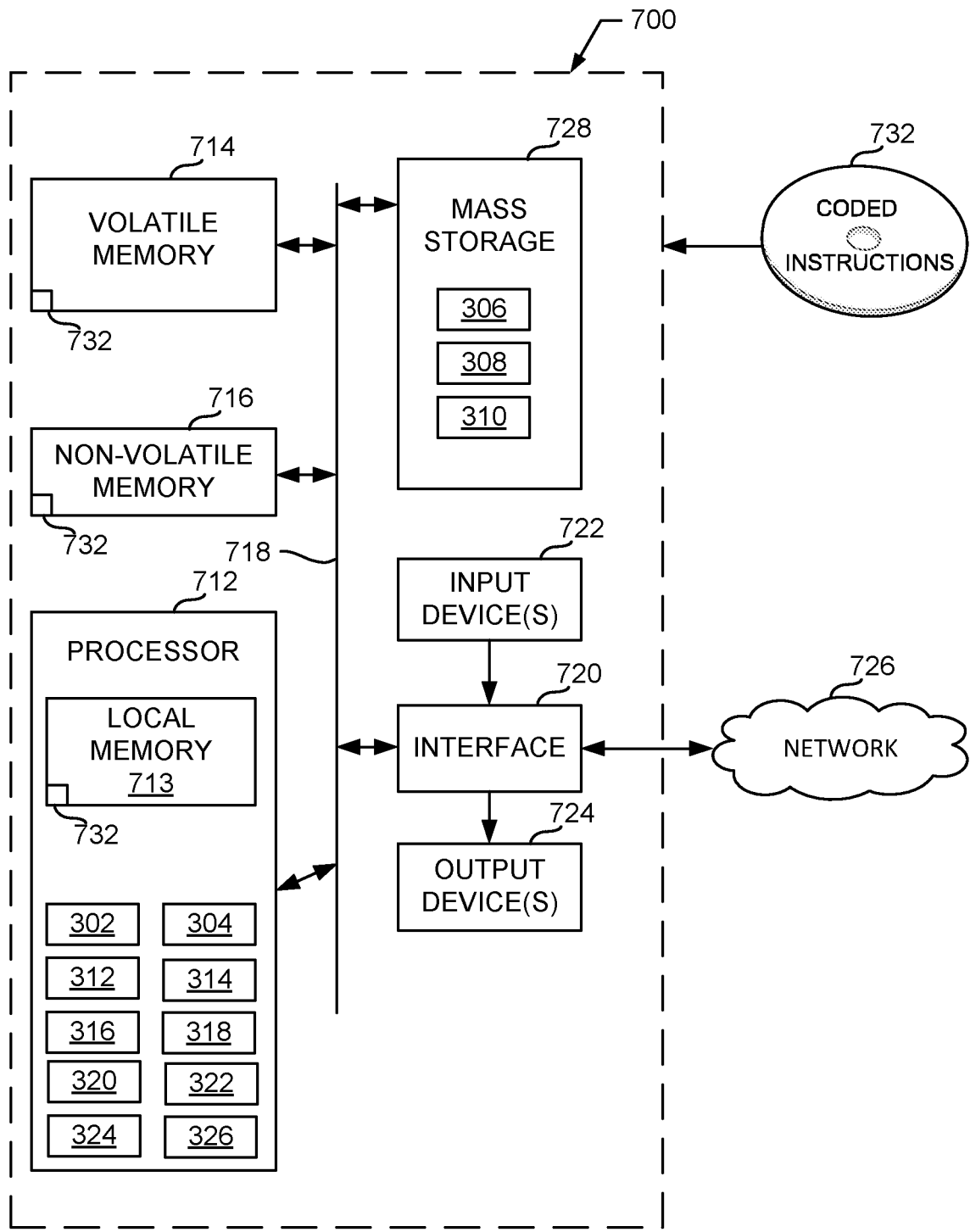
FIG. 7 is a block diagram of an example processing platform structured to execute the instructions of FIG. 5 to implement the example analytics analyzer of FIG. 1 and/or FIG. 3.

FIG. 7 is a block diagram of an example processor platform 700 structured to execute the instructions of FIG. 5 to implement the analytics analyzer 130 of FIG. 1 and/or FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example telemetry receiver 302, the example application programming interface 304, the example client data analyzer 312, the example batch analyzer 314, the example developer interface 316, the example result interface 318, the example maintenance recommender 320, the example configuration comparator 322, the example maintenance duration estimator 324, and the example maintenance risk estimator 326.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that improve analysis, troubleshooting, and develop of components of computing environments. In some examples disclosed herein, machine learning is used to determine how different parameters associated with a software defined data center configuration affect the duration and risk of a maintenance and/or upgrader operation performed at a software defined data center. In some examples, parameters for which telemetry data is to be collected is modifiable by a developer at the software defined data center. Accordingly, the ability to forecast/estimate the duration and risk of performing any of various maintenance and/or upgrade operation is greatly enhanced. With enhanced, more accurate forecasts, data center administrators are more likely to undertake recommended maintenance and/or upgrade operations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   processor circuitry to execute computer readable instructions to at least:
      store telemetry data associated with performing a maintenance operation, system configuration data, and a first secret, the telemetry data, the system configuration data, and the first secret received from a first virtual computing component operating within a virtual computing environment, and the system configuration data identifying a current configuration of at least a portion of the virtual computing environment;
      identify configuration changes between a previous configuration of the at least the portion of the virtual computing environment and the current configuration of the at least the portion of the virtual computing environment;
      select, based on the configuration changes, an analysis model;
      apply the analysis model to the telemetry data to generate analysis results, the analysis results including at least one of a duration estimate for the maintenance operation to be performed at the virtual computing environment and a risk of failure of the maintenance operation to be performed at the virtual computing environment;
      store the analysis results in association with the first secret, and in association with the system configuration data; and
      in response to a request for the analysis results, the request including a second secret:
         retrieve the stored analysis results when the first secret matches the second secret; and
         cause the stored analysis results to be transmitted to a source of the request.

2. The apparatus defined in claim 1, wherein the telemetry data is first telemetry data, and the processor circuitry is to:
   retrain the analysis model using the first telemetry data and second telemetry data from a second virtual computing environment having a same or similar system configuration; and
   provide the retrained analysis model for use in analyzing incoming telemetry data.

3. The apparatus defined in claim 2, wherein the processor circuitry is to:
   store the second telemetry data; and
   store the analysis model.

4. The apparatus defined in claim 2, wherein the processor circuitry is to generate a recommendation to perform the maintenance operation based on a schedule of maintenance operations to be performed.

5. The apparatus defined in claim 4, wherein the processor circuitry is to:
   receive a request to poll the analysis results and the second secret; and
   retrieve the stored analysis results when the second secret matches the first secret stored with the analysis results.

6. The apparatus defined in claim 1, wherein the processor circuitry is to transmit a configuration file to the virtual computing environment, the configuration file to identify additional information to be collected by the virtual computing environment from the first virtual computing component and transmitted with the telemetry data, the additional information related to performing the maintenance operation.

7. The apparatus defined in claim 1, wherein the processor circuitry is to supplement the stored analysis results with at least one of a recommendation of whether to proceed with the maintenance operation, a recommendation to perform a software upgrade or a hardware replacement before performing the maintenance operation, or a recommendation to forego the maintenance operation.

8. The apparatus defined in claim 1, wherein the first secret is at least one of a password, a certificate, or a pre-shared key.

9. A non-transitory computer readable medium comprising instructions that, when executed, cause a machine to at least:
   store telemetry data and a first secret, the telemetry data and the first secret received from a first virtual computing component operating within a virtual computing environment;
   select, based on a maintenance operation to be performed within the virtual computing environment, an analysis model;
   apply the analysis model to the telemetry data to determine an analysis result;
   store the analysis results in association with the first secret; and
   in response to a request for the analysis results, the request including a second secret:
      retrieve the stored analysis results when the first secret matches the second secret; and
      cause the stored analysis results to be transmitted to a source of the request.

10. The non-transitory computer readable medium defined in claim 9, wherein the instructions cause the machine to select the analysis model based on a system configuration of at least a portion of the virtual computing environment.

11. The non-transitory computer readable medium defined in claim 10, wherein the system configuration is a current system configuration of the at least the portion of the virtual computing environment virtual, and the instructions cause the machine to:
   identify a set of configuration changes between the current system configuration and an earlier system configuration; and
   select the analysis model based on the configuration changes.

12. The non-transitory computer readable medium defined in claim 9, wherein the telemetry data is first telemetry data, and the instructions cause the machine to:
   retrain the analysis model using the first telemetry data and second telemetry data from a second virtual computing environment; and
   provide the retrained analysis model for use in analyzing incoming telemetry data.

13. The non-transitory computer readable medium defined in claim 9, wherein the stored analysis results identify at least one of an estimate of a duration of the maintenance operation and a risk of failure of the maintenance operation.

14. The non-transitory computer readable medium defined in claim 12, wherein the instructions cause the machine to:
    store the second telemetry data; and
    store the analysis model.

15. The non-transitory computer readable medium as defined in claim 9, wherein the analysis results include at least one of a recommendation regarding whether to perform the maintenance operation, a recommendation to perform a software upgrade before or after performing the maintenance operation, or a recommendation to reconfigure the virtual computing environment before or after performing the maintenance operation.

16. A method to process telemetry data in networked computing environments, the method comprising:
    storing, by executing an instruction with at least one processor, telemetry data and a first secret, the telemetry data and the first secret received from first a virtual computing component operating within a virtual computing environment;
    selecting, by executing an instruction with the at least one processor, and based on a maintenance operation, an analysis model;
    applying, by executing an instruction with the at least one processor, an analysis model to the telemetry data to determine an analysis result, the analysis results including at least one of a duration estimate for the maintenance operation to be performed at the virtual computing environment and a risk of failure of the maintenance operation to be performed at the virtual computing environment;
    storing, by executing an instruction with the at least one processor, the analysis results in association with the first secret; and
    in response to a request including a second secret:
        retrieving, by executing an instruction with the at least one processor, the stored analysis results associated with the first secret, the first secret matching the second secret; and
        transmitting, by executing an instruction with the at least one processor, the stored analysis results to a source of the request.

17. The method defined in claim 16, wherein the selecting of the analysis model further includes selecting the analysis model based on a system configuration of the virtual computing environment.

18. The method defined in claim 16, wherein the telemetry data is first telemetry data, and further including:
    storing second telemetry data; and
    storing the analysis model.

19. The method defined in claim 16, wherein the analysis results further include at least one of a recommendation of whether to proceed with the maintenance operation, a recommendation to perform a software upgrade or a hardware replacement before performing the maintenance operation, or a recommendation to forego the maintenance operation.

20. The method defined in claim 16, wherein the telemetry data is first telemetry data, and further including retraining the analysis model using the first telemetry data and second telemetry data from a second virtual computing environment and provide the retrained analysis model for use in analyzing third telemetry data.

* * * * *